Aug. 11, 1942.    H. T. KRAFT    2,292,528
MEANS FOR BALANCING WHEELS
Filed Feb. 26, 1940
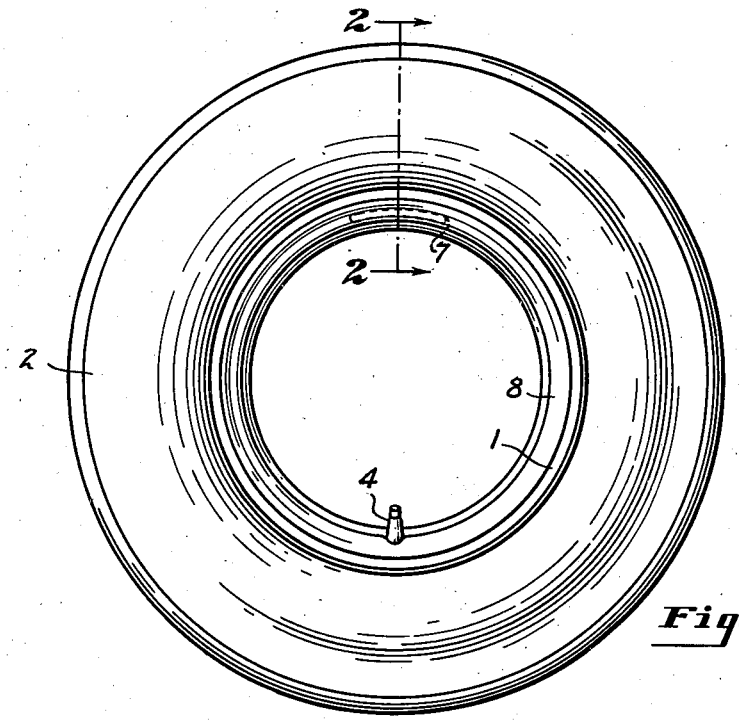
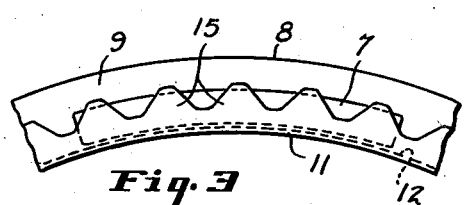
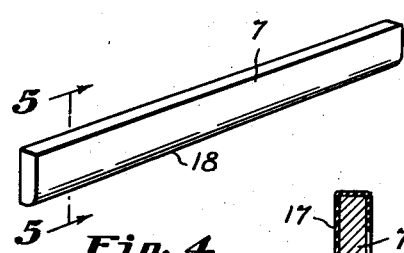
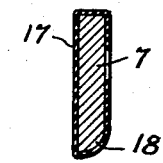
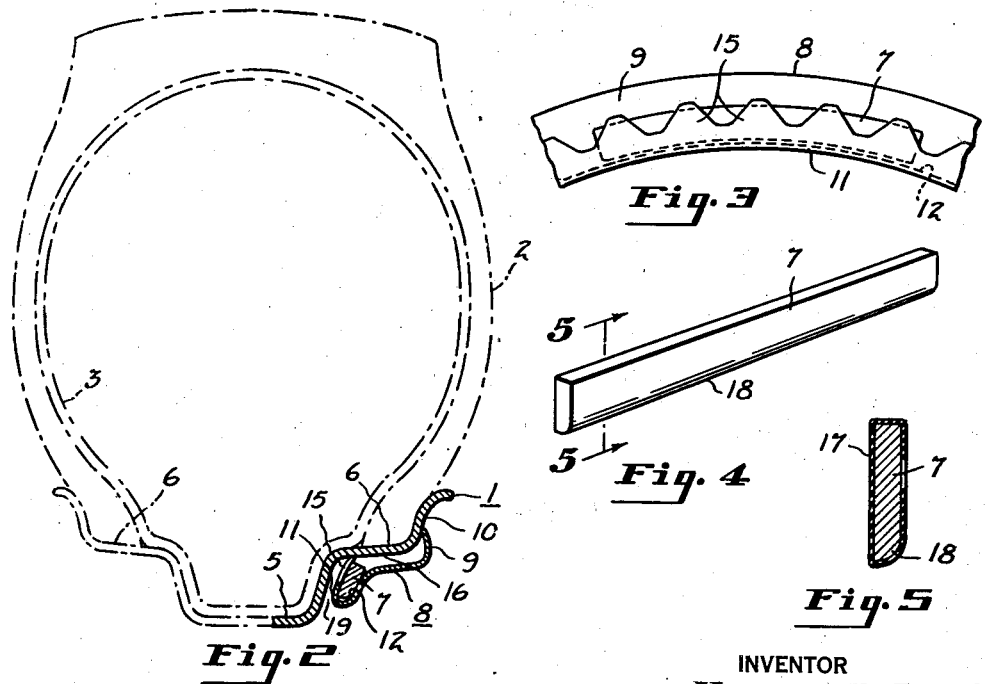
INVENTOR
*Herman T. Kraft*
BY *Evans + McCoy*
ATTORNEYS Patented Aug. 11, 1942

2,292,528

UNITED STATES PATENT OFFICE 2,292,528

MEANS FOR BALANCING WHEELS

Herman T. Kraft, Akron, Ohio, assignor to The General Tire & Rubber Company, Akron, Ohio, a corporation of Ohio Application February 26, 1940, Serial No. 320,741

8 Claims. (Cl. 301—5)

This invention relates to wheel balancing devices, and more particularly to an improved device for balancing automobile wheels.

It is an object of the invention to provide an improved wheel balancer that may be moved to different positions on a wheel rim and quickly and easily secured in place.

Another object is to provide an improved wheel balance that is neat and attractive in appearance and which does not distract from the ordinarily smooth and symmetric appearance of a vehicle wheel rim.

Another object is to provide an improved wheel balance that can be readily removed from and replaced on a vehicle wheel without injury to the balance or the wheel and without the use of special tools or appliances.

Another object is to provide an improved balance for vehicle wheels, the weight of which may be readily adjusted to suit the particular requirements of the wheel to which the balance is to be applied.

A more specific object of the invention is to provide an elongated and cushioned balance weight and means for holding the same adjacent the rim of a wheel in such manner that the balance weight is held against vibration and circumferential movement relative to the wheel rim.

A still further object of the invention is to provide a generally improved balance for a vehicle wheel which is relatively simple in design and construction and inexpensive to manufacture and install. Other objects and advantages will become apparent from the following detailed description of a suitable embodiment of the invention made in connection with the accompanying drawing, in which like parts throughout the several figures are indicated by the same numerals of reference.

Figure 1 is a side elevational view of a vehicle wheel rim having a pneumatic tire casing mounted thereon. The supporting spokes or disk of the wheel have been omitted since they are not essential to the invention;

Fig. 2 is a fragmentary transverse sectional view taken substantially on the line indicated at 2—2 of Fig. 1, showing in full lines the balancing device as applied to the rim, other parts being shown in broken lines;

Fig. 3 is a fragmentary detail showing a balancing weight mounted in a portion of the supporting ring;

Fig. 4 is a perspective view of a balancing weight; and

Fig. 5 is a sectional detail taken substantially on the line 5—5 of Fig. 4.

The invention is preferably embodied in a device which comprises a weight that may be conveniently provided in different lengths or sizes, and a ring-like holding or supporting member for receiving the weight and attaching the same to the rim of a wheel. The drawing illustrates an application of the balancing device to a pneumatic wheel such as is used on present day automobiles. The wheel comprises a suitable hub and support means such as spokes or a disk, not shown, to which is secured an annular rim 1. A pneumatic tire casing 2 of conventional construction is mounted on the rim and inflated by means of an inner tube 3 having a valve stem 4 which projects through a suitable opening formed in the rim 1.

If desired, the rim may be of the drop center type having an annular channel forming portion 5 and annular bead seat portions 6, the latter forming supports for the circumferentially extending beads of the tire casing 2. The rim 1 may be formed of sheet or plate steel which is pressed, rolled, stamped or otherwise formed to approximately the cross sectional shape shown in Fig. 2. Accordingly, the bead supporting portions 6 are formed by somewhat cylindrical tapering portions of the metal rim.

When vehicle wheels of the character described travel at high speed, severe vibrations are apt to be developed if the wheel is not properly balanced. Therefore, in order to improve the riding qualities of vehicles, as well as to increase their safety, it has become customary to individually balance the wheels. The wheels may be tested for balance by various devices and methods not essential to the present invention. To overcome inaccuracies of balance, weight or weights are usually applied and secured to the rim of the wheel, so that when rotated at high speed the wheel is dynamically stable. For example, it is usually necessary to counterbalance the mass of the valve stem 4 such as by a weight indicated generally at 7, although, of course, weights may be required at another point or points about the wheel rim.

The weight 7 is preferably formed of a suitable deformable, relatively inelastic material having a high specific gravity, such, for example, as the metal lead. Desirably, the weight is formed and supplied in a continuous lead strip relatively thin and wide, a portion of such strip being shown in Fig. 4. The weight strip can be easily bent or deformed by hand so that the operator can fit the same into the attaching device or ring, as will later appear. The means for holding the weight 7 to the rim 1 may comprise an annulus or ring 8 formed of relatively thin resilient material, such, for example, as steel or brass. If desired, this attaching ring may be plated or otherwise decorated to serve as an ornamental accessory to improve the appearance of the wheel. In cross section the ring 8 is formed to follow the general contour or shape of one side of the rim 1, against which the same is to be disposed. The outermost edge portion 9 of the ring 8 is curved inwardly so that the edge thereof rests against flange portion 10 of the rim 1, which holds the outer bead of the tire 2 on the outer bead supporting portion 6 of the rim. Inner marginal edge portion 11 of the attaching or supporting ring 8 is bent or formed back upon itself in a radially outwardly directed position to provide a circumferentially extending pocket or channel groove 12 which receives the weight or weights 7, the latter being frictionally embraced by the opposed surfaces of the ring 8 to resist dislodgment or circumferential movement of the weight or weights. Along the edge of the outwardly directed flange portion 11 of the attaching strip 8 are formed a number of blunt pointed tabs 15, the ends of which engage spaced portions of the inwardly directed tapering surface 16 of the rim bead supporting portion 6.

Preferably the weight material 7 in the form of a continuous lead strip is passed through a suitable apparatus for coating the same with rubber or like material 17. This rubber coating increases the friction between the weight or weights and the sides of the weight receiving groove 12 of the attaching ring 8, thus preventing circumferential shifting of the weight or weights with respect to the supporting ring 8. If desired, one corner 18 of the weight strip 7 may be rounded to correspond to the contour of the channel 12 of the attaching ring 8. As shown in Fig. 2, the weight strip 7 with the coating material 17 thereon is of approximately the same size and same cross sectional shape as the channel groove 12 in the holding strip 8, so that the groove or channel is substantially completely filled by the mass of the weight.

In using the balancing device of the present invention the amount of weight and the desired distribution thereof about the wheel rim is experimentally determined. The operator then cuts from a continuous strip of the weight material 7 a piece or pieces of the desired weight or weights and inserts them into positions within the receiving channel or groove 12 of a supporting ring 8 which corresponds to the position or positions desired on the rim 1 of the wheel. The attaching ring 8 is then forced into place against the side of the rim until it reaches approximately the position illustrated in Fig. 2, in which the marginal portion 9 is circumferentially seated against the flange 10 of the rim. During the movement of the attaching or supporting ring 8 to the position shown, the pointed tabs 15 engage the tapering surface 16 of the wheel rim with progressively increasing pressure, so that when the attaching or supporting strip or ring 8 is finally in place, the tabs 15 engage the rim surface 16 with full force to prevent accidental dislodgment of the supporting rim and may even bite into the material of the rim to a limited extent. There may be a slight bending or deforming of the tabs 15, causing the same to bend over the weight 7 as shown in Fig. 2, thus increasing the grip of the holding ring on the weight. In this connection it is to be noted, as shown in Fig. 3, that the tabs 15 overlie one side of the weight strip 7 and only the tip ends of the tabs extend beyond the sides of the lead weight, the weight or weights being thus supported by the holding strip in spaced relation to the rim 1.

In the event that a change of the tire casing 2 or other change in the wheel assembly requires that the balancing weights be moved or shifted, holding strip or ring 8 may be removed from the wheel rim by inserting an implement such as a screwdriver (not shown) into a circumferential groove 19 between the bent-over marginal portion 11 and the rim. By a prying movement of the screwdriver or other implement the ring 8 may then be forced off the tapered, somewhat cylindrical surface portion 16 of the rim to expose the weight or weights 7 so that the latter can be changed or shifted as desired.

It is to be noted that because of the deformable character of the lead material from which the weights 7 are made, the weights can be furnished in a continuous strip which may be either coiled or in straight pieces. Fig. 4 shows a relatively short length of the weight strip material of the present invention, and in Fig. 3 a portion or section of weight strip is shown in deformed position inserted into the holding groove or channel 12 of the attaching or holding strip 8. The desired length of weight as determined by the operator of the balancing system can be manually bent to fit within the receiving channel 12. Furthermore, the use of the weight in the device of the present invention does not mar or injure the weight and the same can be repeatedly used if desired. The coating or rubber cushioning material 17 prevents objectionable rattling or vibration of the weight or weights in the groove or channel 12 of the attaching ring, so that the balancing device is noiseless and vibrationless in operation.

The principles of the present invention may be utilized in various ways, numerous modifications and alterations being contemplated, substitution of parts and changes in construction being resorted to as desired, it being understood that the embodiment shown in the drawing and described above is given merely for purposes of explanation and illustration without intending to limit the scope of the claims to the specific details disclosed.

I claim:

1. A device for balancing a wheel comprising a holding ring having a circumferentially disposed channel groove formed therein, means on the ring for attaching the same to the wheel, a weight disposed in the channel groove, said weight being of relatively short circumferential extent and having approximately the same cross-sectional shape as the channel groove, and a resilient coating on the weight for frictional engagement with the walls of the channel groove to retain the weight against circumferential shifting movement in the groove.

2. For use in balancing a wheel assembly including a circular rim, a spring metal member having a reverse bend, said member being engageable with the rim and deformable thereby to retain itself in fixed position relative thereto, upon being forced into said position and a weight receivable within said reverse bend of the member and held thereby out of contact with the rim, the deformation of the member incident to said engagement with the rim being operative to squeeze the received weight and thereby retain the same in predetermined position relative to the rim periphery.

3. For use in balancing a wheel assembly including a circular rim, a spring metal member having a reverse bend, said member being engageable with the rim and deformable thereby to retain itself in fixed position relative thereto upon being forced into said position, a weight receivable within said reverse bend of the member and held thereby out of contact with the rim, the deformation of the member incident to said engagement with the rim being operative to squeeze the received weight and thereby retain the same in predetermined position relative to the rim periphery, and a relatively soft and deformable cover on the weight separating the same from the spring metal member to prevent contact between the weight and said member and to provide for an increased frictional grip on the weight by the member.

4. In combination for balancing a wheel, a circular holding member formed of thin spring metal and having reversely bent flange means providing a circumferentially extending channel having opposed surfaces, a rubber covered lead weight receivable within the channel at different positions around the circumference thereof, said weight being received between the opposed surfaces of the spring metal holding member so that the weight is wholly supported thereby in spaced relation to a wheel balanced thereby, the rubber cover only of the weight being engaged by the opposed surfaces and said holding member being so formed that said flange means is engaged and bent by the wheel in forcing the holding member into position, the bending of the flange means tending to move said opposed surfaces toward one another to squeeze the received weight therebetween and thereby hold the weight in predetermined position within the channel.

5. Weight means for balancing wheels comprising an elongated substantially continuous flat strip of soft metal having a width several times its thickness so that it can be readily coiled on itself for handling and from which pieces can be severed for use as desired, and a thin coating of resilient and deformable non-metallic material embracing the strip to cushion the same.

6. Weight means for balancing wheels comprising an elongated substantially continuous flat strip of soft metal having a generally rectangular cross section and a width several times its thickness so that it can be readily coiled on itself for handling and from which pieces can be severed for use as desired, and a thin coating of resilient and deformable non-metallic material embracing the strip to cushion the same.

7. Weight means for balancing wheels comprising an elongated substantially continuous flat strip of soft metal having a generally rectangular cross section and a width several times its thickness so that it can be readily coiled on itself for handling and from which pieces can be severed for use as desired, one edge corner of the strip being rounded, and a thin coating of resilient and deformable non-metallic material embracing the strip to cushion the same.

8. In combination for balancing a wheel, a holding member curved to fit the contour of a wheel and formed of thin spring metal, said holding member including reversely bent flange means providing a channel having opposed wall surfaces, an elongated weight of relatively soft material receivable within the channel between the opposed wall surfaces of the spring metal holding member so that the weight is wholly supported thereby in spaced relation to a wheel balanced by the weight, said weight being of less length than the channel for movement to different longitudinal positions therein and having a width less than the depth of the channel so that both said opposed wall surfaces of the flange means extend beyond one edge of the received weight, and said holding member being so formed that the flange means is engaged and bent by the wheel in forcing the holding member into position, the bending of the flange means tending to move said opposed surfaces toward one another to squeeze the received weight therebetween and to cause one of said surfaces to partially overlie said one edge of the weight to thereby hold the weight in predetermined position within the channel.

HERMAN T. KRAFT.